UNITED STATES PATENT OFFICE.

PIERRE DE P. RICKETTS, OF NEW YORK, N. Y.

IMPROVEMENT IN SEPARATING TIN FROM TIN SCRAP.

Specification forming part of Letters Patent No. 148,760, dated March 17, 1874; application filed February 19, 1874.

*To all whom it may concern:*

Be it known that I, PIERRE DE P. RICKETTS, of the city, county, and State of New York, have invented a new and useful Improvement in Process for Separating Tin from Iron in Tinners' Clippings; and I do hereby declare the following to be a full, clear, and exact description thereof, which will enable those skilled in the art to make and use the same.

This invention relates to certain improvements on the process for separating tin from iron in tinners' clippings described in the Patent No. 128,265, granted to Thomas F. Wells, June 25, 1872.

These improvements consist in treating the clippings or scraps, first, in a bath of hydrochloric acid, until about two-thirds of the tin has been dissolved, then immersing the same in a bath of hydrochloric acid, mixed with other acids, until the remainder of the tin is dissolved, so that from the first bath a comparatively pure tin and pure chloride of zinc are obtained, as hereinafter described; while the second bath yields an inferior product, consisting of tin mixed with iron. For the purpose of precipitating the tin from the solution I use the "dross" from galvanizing iron and scrap galvanized iron, thereby effecting a saving in zinc, and increasing the yield of iron scraps.

In carrying out my invention, I provide a series of tanks or vats, which are made acid-proof, and which are filled, one with hydrochloric acid, the second with a mixture of hydrochloric acid, mixed with other acids—such as nitric acid, or sulphuric acid—a third with clean water, and so on. The scraps or clippings from which the tin is to be removed I collect in a suitable drum or basket, and immerse the same in the first bath of hydrochloric acid, until about two-thirds of the tin has been dissolved. I then remove the scraps from the first bath, and immerse the same in the second bath until the remainder of the tin is dissolved.

By following this course, I obtain, in my first bath, a pure chloride of tin, almost free from iron, which, when, having been precipitated by means of zinc, gives a pure tin, the market value of which is much higher than that of tin contaminated with iron. Besides this, I obtain pure chloride of zinc, which can be used with advantage for preserving wood.

My second bath, which contains nearly all the iron dissolved, will yield an impure tin; also, a material which will command a good price as a disinfectant.

For the purpose of precipitating the tin from the solution, I use dross from galvanizing iron and scrap galvanized iron in the same manner in which metallic zinc is commonly employed for this purpose; and, since the dross obtained in the process of galvanizing iron, and also scrap galvanized iron, are commonly considered and treated as mere waste, I effect a saving of from four to six cents per pound upon the zinc used; and, furthermore, I obtain a quantity of iron from the dross and from the scrap galvanized iron, which can be sold with the iron from the tin scrap.

The iron from the zinc will, of course, be in the bottom of the tank, after precipitation, with the metallic tin, and may be separated from the same by throwing it on a sieve.

From the foregoing description it will be seen that the principal aim of my improvements is to reduce the expense of the process for removing the tin from iron in tinners' clippings; and, since the practical success of such process depends wholly upon the question of profit or loss, the saving of a few cents renders my process a success, while other processes, by which tin can be easily removed from tinners' clippings are practically failures, because they do not pay.

What I claim as new, and desire to secure by Letters Patent, is—

1. The process of separating tin from iron in tinners' clippings, by immersing said clippings first in a bath of hydrochloric acid, until about two-thirds of the tin is dissolved, and then introducing said clippings in a second bath of hydrochloric acid mixed with other acids, such as nitric acid or sulphuric acid, substantially as set forth.

2. The process of precipitating tin from the solution by means of dross from galvanizing iron or scraps of galvanized iron, substantially as and for the purpose described.

P. DE P. RICKETTS.

Witnesses:
W. HAUFF,
E. F. KASTENHUBER.